United States Patent
Vine

[19]

[11] Patent Number: 5,544,911
[45] Date of Patent: Aug. 13, 1996

[54] AIRBAG MODULE DIFFUSER WITH FLANGE EXTENSIONS

[75] Inventor: Daniel C. Vine, Layton, Utah

[73] Assignee: Morton International, Inc., Chicago, Ill.

[21] Appl. No.: 498,202

[22] Filed: Jul. 5, 1995

[51] Int. Cl.⁶ ............................ B60R 21/20; B60R 21/26
[52] U.S. Cl. ........................... 280/728.2; 280/740
[58] Field of Search ..................... 280/728.2, 740, 280/732, 728.1, 730.1, 728.3, 736, 742, 743.1

[56] References Cited

U.S. PATENT DOCUMENTS

| | | | |
|---|---|---|---|
| 3,794,346 | 2/1974 | Brockman et al. | 280/740 |
| 3,794,347 | 2/1974 | Zens | 280/740 |
| 4,153,273 | 5/1979 | Risko | 280/740 |
| 4,414,902 | 11/1983 | Strasser et al. | 102/531 |
| 4,944,527 | 7/1990 | Bishop et al. | 280/741 |
| 4,998,751 | 3/1991 | Paxton et al. | 280/741 |
| 5,058,919 | 10/1991 | Paquette et al. | 280/732 |
| 5,248,162 | 9/1993 | Levosinski et al. | 280/740 |
| 5,263,739 | 11/1993 | Webber et al. | 280/728.2 |
| 5,332,256 | 7/1994 | Lauritzen et al. | 280/728.2 |
| 5,344,182 | 9/1994 | Lauritzen et al. | 280/728.2 |
| 5,407,226 | 4/1995 | Lauritzen et al. | 280/732 |
| 5,470,105 | 11/1995 | Rose et al. | 280/740 |

FOREIGN PATENT DOCUMENTS

93/08042  4/1993  WIPO ........................... 280/728.1

Primary Examiner—Kevin Hurley
Assistant Examiner—Peter C. English
Attorney, Agent, or Firm—George W. Rauchfuss, Jr.; Gerald K. White

[57] ABSTRACT

An airbag module diffuser having a pair of flange extensions that fit within an open mouth of an airbag cushion secured within a reaction canister of an airbag module assembly, preventing the mouth from collapsing inwardly during inflation of the airbag cushion. The flange extensions also contain a folded portion of the airbag cushion within open ends of the reaction canister independently of a pair of endplates that attach to the canister over the open ends, preventing the folded portion of the airbag cushion from being pinched by the endplates upon their assembly.

16 Claims, 3 Drawing Sheets

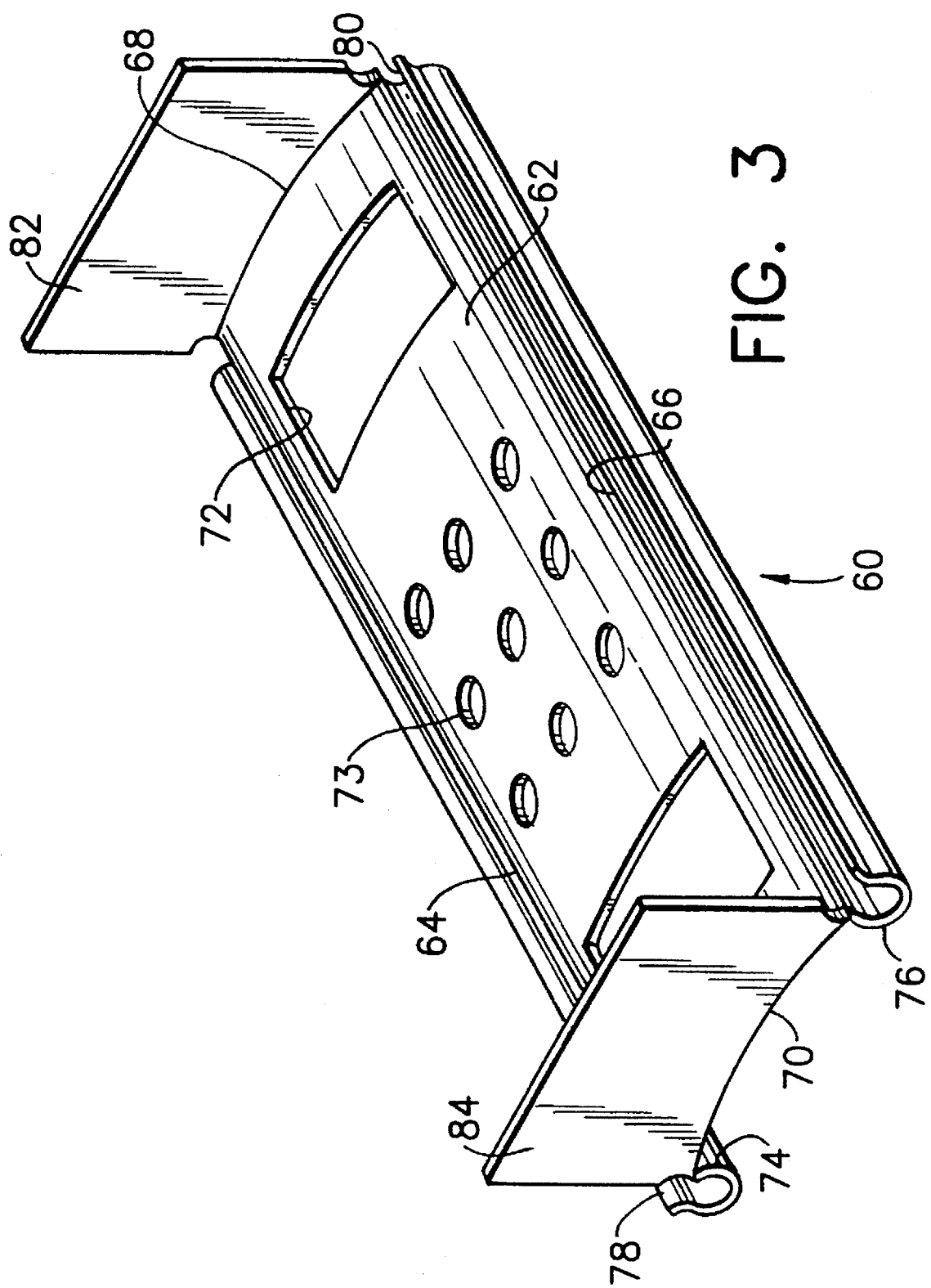

AIRBAG MODULE DIFFUSER WITH FLANGE EXTENSIONS

FIELD OF THE INVENTION

The present invention relates to a diffuser for use in an airbag module assembly. More particularly, the present invention relates to a diffuser having a pair of flange extensions that hold open a mouth of an airbag cushion secured within a reaction canister of the airbag module assembly so that the mouth does not collapse inwardly during inflation of the airbag cushion. The flanges also help direct the flow of inflation gas into the mouth, and contain a folded portion of the airbag cushion within the reaction canister.

BACKGROUND OF THE INVENTION

Increasing the reliability of airbag module assemblies is desirable. In addition, simplifying the assembly process and expanding the design options of airbag module assemblies would be helpful, saving time and reducing costs in an increasingly competitive industry.

An airbag module assembly is part of an inflatable restraint system that automobile manufacturers install in automobiles for protecting an occupant by physically restraining the occupant if the automobile encounters a collision.

Certain types of airbag module assemblies normally include a reaction canister, an inflator, a diffuser, an airbag cushion, and means for securing the assembly together. The reaction canister is formed from extruded aluminum and has an open top through which a portion of the airbag cushion escapes during inflation. The inflator is secured within the canister and contains means for producing the inflation gas for inflating the airbag cushion. The diffuser is also secured within the canister and generally comprises a shelf that encloses the inflator. The diffuser shelf has a plurality of diffusing openings that deliver inflation gas from the inflator to the airbag cushion.

The stored airbag cushion includes a folded portion leading to a generally rectangular open mouth formed by two opposite mouth side edges and two shorter opposite mouth ends. The two mouth side edges are secured to the canister above the diffuser so that inflation gas from the inflator diffuses into the mouth through the diffuser openings in the diffuser shelf.

During inflation of the airbag cushion, inflation gases can escape from between the diffuser and the mouth ends of the airbag cushion. These escaping gases can cause the mouth to collapse inwardly, preventing correct deployment of the airbag cushion. To avoid this, some previous airbag cushions were manufactured with additional strips of cushion material sewn onto the ends of the mouth and secured by the endplates of the canister. However, this method adds greatly to the complexity of the airbag cushion and the airbag module manufacturing process.

Preventing the folded portion of the airbag cushion from becoming pinched by the endplates of the canister during assembly, which can retard the deployment of the airbag upon inflation, has also been a concern. During assembly, the inflator is first secured within the reaction canister. The diffuser and airbag cushion, and the endplates are then attached to close the ends of the canister, containing the airbag cushion therein. Preventing the folded portion of the airbag cushion from becoming pinched by the endplates of the canister has required inspections and the use of controls and sensors on assembly equipment, complicating the manufacturing process.

In addition, since the endplates help contain the folded portion of the airbag cushion within the canister, they must normally be attached to the module assembly after the airbag cushion is installed. Yet, once the endplates are attached the interior of the canister cannot be accessed. The inflator, therefore, must be secured within the canister before the diffuser, airbag cushion and endplates. This factor restricts the order of assembly and also adds to the complexity of manufacturing the airbag module assembly.

Modifying the airbag module assembly or a component of the assembly to prevent the mouth of the airbag cushion from collapsing inwardly during inflation, to prevent the airbag cushion from becoming pinched by the endplates, and to eliminate reliance on the endplates for containing the airbag cushion within the reaction canister would be very helpful. This would increase the reliability, simplify the manufacturing process and reduce the manufacturing costs of the airbag module assembly.

SUMMARY OF THE INVENTION

An object, therefore, of the present invention is to prevent the mouth of an airbag cushion from collapsing inwardly during inflation of the airbag cushion.

Another object of the present invention is to prevent the folded portion of the airbag cushion from being pinched by the endplates of the reaction canister.

An additional object of the present invention is to contain the folded portion of the airbag cushion within the ends of the reaction canister independently of the endplates.

A further object of the present invention is to allow the endplates to be removed from the ends of the reaction canister of the assembled airbag module assembly without disturbing the folded portion of the airbag cushion, to gain access therein.

Yet another object of the present invention is to provide increased options in the order of assembly of the components of an airbag module assembly.

In carrying out this invention, there is provided a diffuser having a pair of flange extensions for use in an airbag module assembly. The diffuser includes a diffuser shelf having a plurality of diffusing openings. A pair of flange extensions attach to opposite diffuser ends, respectively, of the diffuser shelf and extend generally perpendicular to the diffuser shelf. The flanges are sized and adapted to fit within an open mouth of an airbag cushion, thereby preventing the mouth from collapsing inwardly during inflation of the airbag cushion. The flange extensions are also sufficiently wide to contain a folded portion of the airbag cushion therebetween.

According to another aspect of the present invention, an airbag module assembly incorporating the diffuser with flange extensions is provided. The airbag module assembly additionally comprises a trough-shaped reaction canister, an inflator and an airbag cushion. The airbag cushion includes a folded portion leading to a generally rectangular open mouth partially formed by opposite mouth ends. The reaction canister has a bottom wall and a pair of sidewalls forming a pair of open ends and an open top. The canister further includes a pair of attached endplates covering the open ends, respectively.

The inflator is mounted within the reaction canister adjacent the bottom wall and between the endplates. The diffuser is mounted within the reaction canister above the inflator, with opposite diffuser side edges of the diffuser shelf adjacent the sidewalls of the canister, respectively, and the pair of opposite diffuser ends of the diffuser shelf adjacent the endplates of the canister, respectively, thereby enclosing the inflator within the canister.

The pair of flange extensions attach to the opposite diffuser ends of the diffuser shelf, respectively, and extend generally perpendicular to and towards the open top of the canister. The airbag cushion is placed within the reaction canister above the diffuser shelf, with the folded portion of the airbag cushion fitting between the flange extensions. The flange extensions fit within the open mouth of the airbag cushion with the opposite mouth ends held open by the flange extensions, respectively, thereby preventing the mouth ends from collapsing inwardly during inflation of the airbag cushion. The flange extensions also help direct the flow of inflation gas into the open mouth of the airbag cushion.

According to an additional aspect of the present invention, the mouth ends are clamped between the flange extensions and the endplates, respectively, when the endplates are attached to the canister so that the mouth ends are further secured.

The flange extensions are sufficiently wide to contain the folded portion of the airbag cushion within the ends of the reaction canister independently of the endplates. The flange extensions, accordingly, prevent the folded portion of the airbag cushion from getting pinched by the endplates of the reaction canister as one or both endplates are attached.

According to a further aspect of the invention, the endplates are removably attached to the reaction canister so that, with the diffuser shelf and flange extensions containing the folded portion of the airbag cushion independently of the endplates, the endplates may be removed from the canister to allow access into the canister. In addition, with the endplates removed the inflator may also be removed from the assembled airbag module assembly or mounted in the canister after the diffuser and the airbag cushion. This facilitates assembly at more than one site, if desired.

In summary, by providing a diffuser with flange extensions multiple benefits are achieved. Because the diffuser flanges prevent the opposite mouth ends of the airbag cushion from collapsing inward during inflation of the airbag cushion and help direct inflation gases in to the open mouth, one benefit is eliminating the need to attach additional strips of airbag cushion material to the airbag cushion and securing the strips between the endplates and the canister. Also, because the flange extensions are sufficiently wide to contain the folded portion of the airbag cushion within the ends of the canister independently of the endplates, another benefit is to eliminate the need for implementing prevention and detection methods during the assembly process to ensure that cushion material does not become pinched by the endplates of the reaction canister.

Furthermore, because the diffuser shelf and diffuser flange extensions contain the folded airbag cushion, an additional benefit is maximizing assembly processing options since the airbag module can be processed without requiring installation of the endplates or inflator at the earlier stages of assembly. In addition, the endplates can be removed from the canister of an assembled airbag module assembly to gain access therein, without disturbing the folded portion of the airbag cushion.

The invention together with further objects, features, advantages and aspects thereof, will be more clearly understood from the following description taken in connection with the accompanying drawings.

BRIEF DESCRIPTION OF THE DRAWINGS

FIG. 3 is a perspective view of the diffuser of the airbag module assembly of FIG. 1.

The same reference numerals refer to the same elements throughout the various figures.

DETAILED DESCRIPTION OF THE INVENTION

Figure 1:
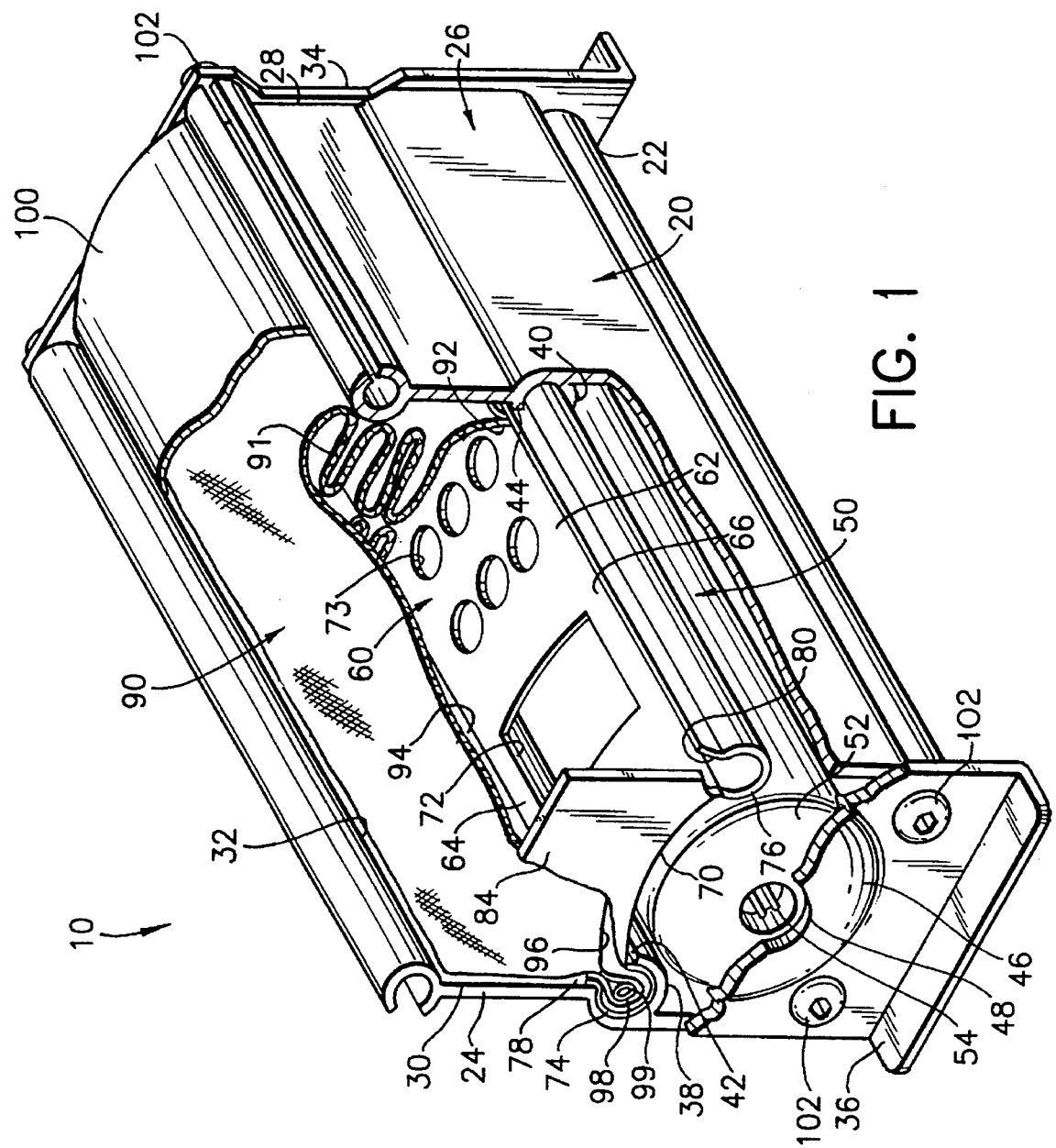
FIG. 1 is a perspective view, partially cutaway, of an airbag module assembly including a diffuser, according to the present invention.
Figure 2:
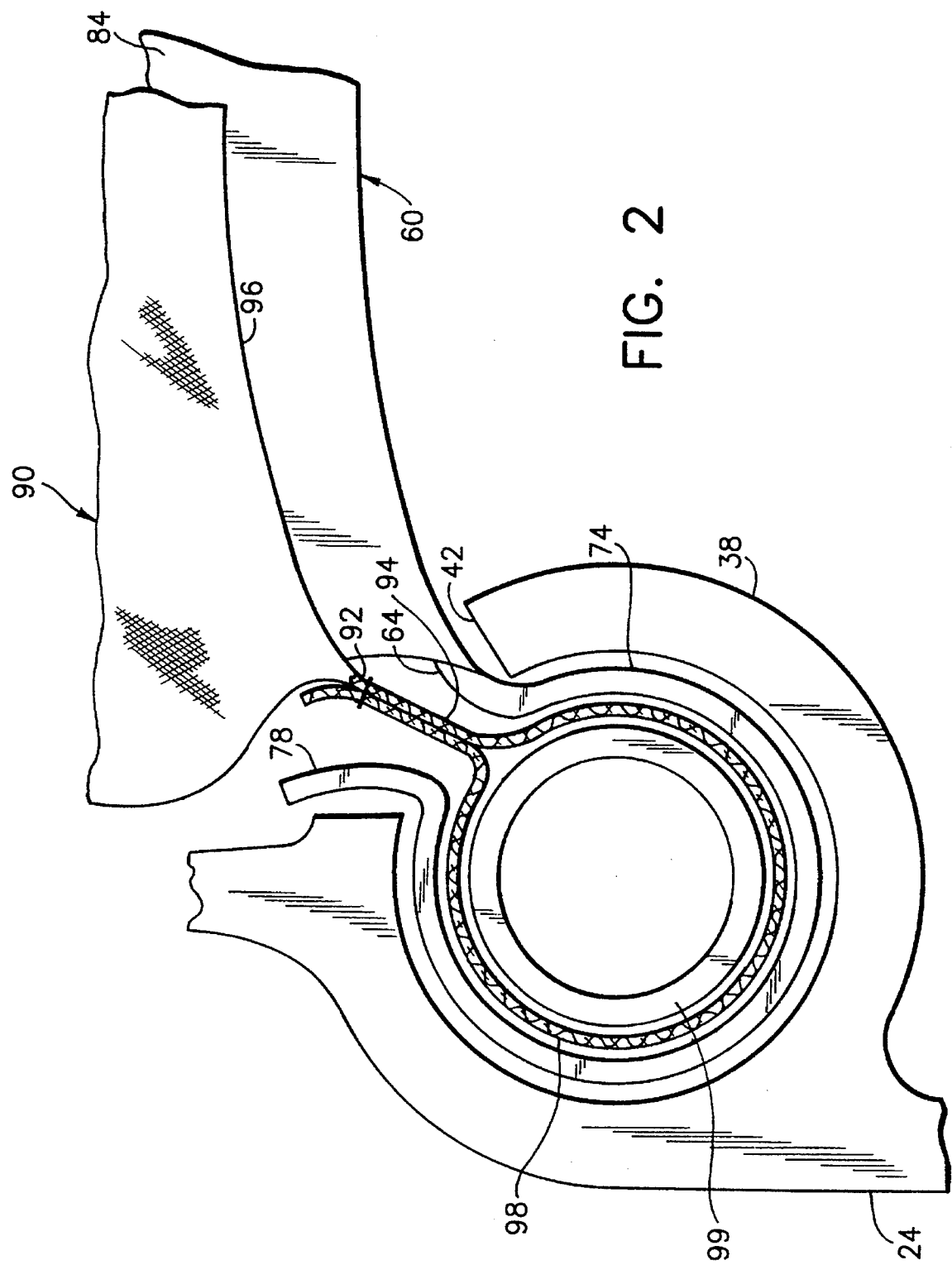
FIG. 2 is an enlarged end elevation view of a portion of the airbag module assembly of FIG. 1.

Referring to FIGS. 1–3, the present invention is directed to an airbag module assembly 10 incorporating a diffuser 60 having flange extensions 82,84. The airbag module also incorporates a reaction canister 20 with endplates 34,36, an inflator 50, and an airbag cushion 90. Other parts of an airbag module including the particular elements of an inflator, how an inflator generates gas and the remote sensors for triggering the inflator are all known in the art and, accordingly, are not described in detail as they do not in themselves constitute features of the present system. Only the components of an airbag module assembly according to the present invention, including the portions of a reaction canister 20, an airbag cushion 90, and exterior portions of an inflator 50 as they relate to the instant invention will be described in detail.

Referring first to FIGS. 1 and 2, an airbag module assembly of the present invention, generally represented by the reference numeral 10, has a trough-shaped reaction canister, generally represented by the reference numeral 20, having a bottom wall 22 and a pair of sidewalls 24,26, forming a pair of open ends 28,30 and an open top 32. The canister 20 also includes a pair of removably attached endplates 34,36 covering the open ends 28,30, respectively.

Each side wall 24,26 has a respective parallel cylindrical channel 38,40 extending between the open ends 28,30 and each channel has a respective lengthwise slot 42,44. The second endplate 36 has a concave portion 46 having an access aperture 48, and the first endplate 34 has a stud-receiving opening (not shown) opposite the access aperture 48.

An inflator 50 is mounted within the canister 20 adjacent the bottom wall 22 between the endplates 34,36 and below the parallel channels 38,40. The inflator 50 has a first end having a stud extending therefrom, not shown but common in the art, and a second end 52 having a receptacle 54 for connection to a remote sensor and power supply. The second end 52 fits within the concave portion 46 of the second endplate 36 with the access aperture 48 positioned over the receptacle 54. The first end is positioned adjacent the first endplate 34 with the stud extending through the stud-receiving opening and a nut is threaded thereon to secure the inflator 50 within the reaction canister 20 between the endplates 34,36.

A diffuser 60 is mounted within the reaction canister 20 between the endplates 34,36 thereof and above the inflator 50. The diffuser 60 includes a diffuser shelf 62 having a pair of opposite diffuser side edges 64,66 positioned adjacent the sidewalls 24,26 of the canister 20, respectively, and a pair of opposite diffuser ends 68,70 positioned adjacent the endplates 34,36 of the canister 20, respectively. The diffuser shelf 62 cooperates with the reaction canister 20 to thereby enclose or surround the inflator 50. The diffuser shelf 62 further has a plurality of diffusing openings 72,73 formed therethrough.

Referring also to FIG. 3, the diffuser 60 of the present invention is shown independent of the airbag module assembly 10. The plurality of diffusing openings 72,73 of the diffuser 60 may include a pair of generally rectangular openings 72 located adjacent respectively the opposite diffuser ends 68,70 of the diffuser shelf 62 and nine smaller generally circular openings 73 forming three rows of three openings located generally midway between the rectangular openings 72. The diffusing openings 72,73 diffuse generated gas from the inflator 50 into an airbag cushion 90 which is mounted within the canister 20 above the diffuser 60 as explained below.

The diffuser 60 further includes a pair of diffuser side tubes 74,76 attached to the diffuser side edges 64,66 of the shelf 62, respectively. To mount the diffuser 60 within the reaction canister 20, the diffuser side tubes 74,76 are positioned within the parallel channels 38,40, respectively, formed in the sidewalls 24,26 of the canister 20. The side tubes 74,76 are wider than the lengthwise slots 42,44 in the parallel channels 38,40 so that the diffuser side tubes 74,76 are secured within the channels 38,40. Each side tube has a respective lengthwise unclosed portion 78,80.

A pair of flange extensions 82 and 84 are attached to the opposite diffuser ends 68,70 of the diffuser shelf 62, respectively, and extend generally parallel to and towards the open top 32 of the canister 20. The flange extensions 82,84 are generally rectangular and, when the diffuser is mounted within the canister 20, extend between the sidewalls 24,26 and substantially to the open top 32. The airbag cushion 90 is mounted within the reaction canister 20 above the diffuser shelf 62. The airbag cushion includes a folded portion 91 leading to a generally rectangular open mouth 92 partly formed by a mouth end 96. The flange extensions 82,84 fit within the open mouth 92 with the mouth end 96 held open by flange extension 84. The open mouth 92 is additionally formed by a similar, opposite mouth end, not shown, which is held open by the flange extension 82.

The generally rectangular mouth 92 is additionally formed by a longer mouth side edge 94 forming a first airbag mouth tube 98 positioned within the side tube 74 of the diffuser shelf 62 as seen in FIGS. 1 and 2. A first securing tube or rod 99 extends from one endplate 34 to the other endplate 36 through the airbag mouth tube 98. The securing tube 99 is wider than the unclosed portion 78 of the side tube 74 of the diffuser shelf 62 so that the securing tube 99 secures the mouth tube 98 of the airbag cushion 90 within the side tube 74 of the diffuser shelf 62 which is in turn secured within the channel 38 of the side wall 24 to mount the airbag cushion 90 to the reaction canister 20. The airbag cushion mouth 92 is also formed by a similar opposite mouth side edge, not shown, forming a similar second mouth tube which is secured within side tube 76 by a similar second securing tube, not shown.

The mouth ends 96 are clamped between the flange extensions 82,84 and the endplates 34,36, respectively, when the endplates are attached to the canister 20. Finally, an airbag cushion cover 100 covers the open top 32 of the reaction canister 20 and encloses the airbag cushion 90 therein. The assembly is secured together by a plurality of screws 102 which extend through the endplates 34,36 into the reaction canister 20.

When an automobile having an inflatable restraint system incorporating the airbag module assembly 10 of the present invention encounters a collision, a remote sensor initiates the inflator 50. The inflator 50 produces inflation gas that is diffused by the diffuser 60 into the open mouth 92 of the airbag cushion 90. The folded portion 91 of the airbag cushion 90 then inflates, breaks the airbag cushion cover 100 and escapes out the open top 32 of the reaction canister 20 to restrain an occupant of the automobile. The flange extensions 82,84 positioned within the open mouth 92 of the airbag cushion 90 prevent the mouth end 96 of the open mouth 92 from collapsing inwardly during inflation of the airbag cushion 90. The flange extensions 82,84 also help direct the flow of inflation gas into the mouth 92 of the airbag cushion 90.

In addition, the flange extensions 82,84 are of sufficient width to contain the folded portion 91 of the airbag cushion 90, prior to inflation, within the ends 28,30 of the reaction canister 20 independently of the endplates 34,36. The flange extensions 82,84 therefore prevent the folded portion 91 from becoming pinched between the endplates 34,36 and the reaction canister 20 during installation of the endplates. Equipment costs savings are derived from not requiring additional inspections or controls and sensors on assembly equipment that ensure cushion material does not become pinched.

Furthermore, the flange extensions 82,84 allow the endplates 34,36 to be removed from the canister 20 without disturbing the folded portion 91 of the airbag cushion 90, to gain access therein. The endplates 34,36 may also be assembled to the airbag module 10 last, thus increasing assembly options, and in particular permitting installation of the inflator 50 at a later time or at a different site.

The airbag module assembly according to the present invention may include other changes and modifications without departing from the true spirit and scope of the present invention. For example, the reaction canister 20 may be shaped differently to accommodate a different inflator or to meet the requirements of a specific automobile. The inflator 50 may be secured within the canister differently, and may not even be fully enclosed within the canister as long as inflation gas from the inflator is directed through the diffuser 60 and into the airbag cushion 90. The channels 38,40 may be square or triangular as opposed to cylindrical, or another means could be used for securing the diffuser and airbag cushion within the canister.

The diffuser according to the present invention may also include other changes and modifications without departing from the true spirit and scope of the present invention. For example, the diffusing openings 72,73 may be configured differently. Also, the flange extensions 82,84 may include slots or holes to provide access to the airbag cushion contained therein. The diffuser side tubes 74,76 may be square or triangular as opposed to cylindrical, or the diffuser may not include the diffuser side tubes depending upon the means for securing the diffuser within the reaction canister.

Since other requirements and environments varied to fit particular operating requirements and environments will be apparent to those skilled in the art, the invention is not considered limited to the examples chosen for purposes of illustration, and includes all changes and modifications which do not constitute a departure from the true spirit and scope of this invention as claimed in the following claims and equivalents thereto.

I claim:

1. A diffuser for use in an airbag module assembly, the airbag module assembly having a trough-shaped reaction canister with a pair of sidewalls forming a pair of open ends, an open top and a pair of endplates respectively covering the open ends, an inflator mounted within the reaction canister between the endplates and an airbag cushion, having a folded portion leading to an open mouth partly formed by two opposite mouth ends, mounted within the reaction canister between the endplates and above the inflator, the diffuser comprising:

a diffuser shelf sized and adapted to be positioned within the canister to enclose the inflator and separate the inflator from the airbag cushion, the diffuser shelf defining a plurality of diffusing openings and having a pair of opposite diffuser side edges and a pair of opposite diffuser ends; and a pair of flange extensions attached to the opposite diffuser ends, respectively, and extending generally perpendicular to the diffuser shelf, the flange extensions sized and adapted to fit within the open mouth of the airbag cushion with the opposite mouth ends held open respectively by the flange extensions, whereby the flange extensions will prevent the mouth ends from collapsing inwardly during inflation of the airbag cushion and will help direct the flow of inflation gas into the mouth of the airbag cushion, the flange extensions sized and adapted to extend between the sidewalls of the canister and substantially to the open top of the canister to contain the folded portion of the airbag cushion within the ends of the reaction canister independently of the endplates, whereby the flange extensions will also prevent the folded portion of the airbag cushion from getting pinched by the endplates of the reaction canister.

2. The diffuser of claim 1 wherein the diffuser shelf is sized and adapted to extend between the open ends of the reaction canister so that the flange extensions will butt against the endplates and clamp the mouth ends of the airbag cushion therebetween when the endplates are mounted to the canister.

3. The diffuser of claim 2 wherein the flange extensions are integrally formed with the shelf.

4. The diffuser of claim 3 wherein the diffuser shelf further includes a pair of diffuser side tubes respectively attached to the side edges of the diffuser shelf, each of the diffuser side tubes having a lengthwise unclosed portion, the tubes sized and adapted to fit respectively within a pair of parallel channels formed respectively in the sidewalls of the canister, for securing the diffuser shelf within the canister.

5. The diffuser of claim 4 wherein the pair of diffuser side tubes are integrally formed with the shelf.

6. The diffuser of claim 2 wherein the diffuser shelf further includes a pair of diffuser side tubes respectively attached to the side edges of the diffuser shelf, each of the diffuser side tubes having a lengthwise unclosed portion, the tubes sized and adapted to fit respectively within a pair of parallel channels formed respectively in the sidewalls of the canister, for securing the diffuser shelf within the canister.

7. An airbag module assembly comprising:

a trough-shaped reaction canister having a bottom wall and a pair of sidewalls forming a pair of open ends and an open top, the canister further having a pair of endplates attached to the canister respectively covering the open ends;

an inflator mounted within the reaction canister adjacent the bottom wall and between the endplates;

a diffuser mounted within the reaction canister above the inflator, the diffuser having a diffuser shelf having a pair of opposite diffuser side edges respectively adjacent the sidewalls of the canister and a pair of opposite diffuser ends respectively adjacent the endplates of the canister, thereby enclosing the inflator within the canister and the endplates, the diffuser shelf having a plurality of diffusing openings formed therethrough;

a pair of flange extensions respectively attached to the opposite diffuser ends of the diffuser shelf and extending generally normal to and towards the open top of the canister; and an airbag cushion mounted within the reaction canister above the diffuser shelf and between the flange extensions of the diffuser, the airbag cushion having a folded portion leading to a generally rectangular open mouth partly formed by opposite mouth ends, the flange extensions fitting within the open mouth of the airbag cushion with the opposite mouth ends held open respectively by the flange extensions, whereby the flange extensions prevent the mouth ends from collapsing inwardly during inflation of the airbag cushion and help direct the flow of inflation gas into the open mouth, the flange extensions being sufficiently wide to contain the folded portion of the airbag cushion within the ends of the reaction canister independently of the endplates, whereby the flange extensions also prevent the folded portion of the airbag cushion from getting pinched by the endplates of the reaction canister as one or both endplates are attached.

8. The airbag module assembly of claim 7 wherein the mouth ends are respectively clamped between the flange extensions and the endplates when the endplates are attached to the canister so that the flange extensions and endplates in combination further secure and prevent the mouth ends from collapsing inwardly during inflation of the airbag cushion.

9. The airbag module assembly of claim 8 wherein each side wall of the reaction canister further includes a respective parallel channel extending between the open ends, each channel having a lengthwise slot, the diffuser shelf further includes a pair of diffuser side tubes respectively attached to the diffuser side edges with each side tube having a lengthwise unclosed portion and positioned respectively within the parallel channels, the diffuser side tubes being wider than the slots in the channels so that the side tubes are secured in the channels.

10. The airbag module assembly of claim 9 wherein the generally rectangular open mouth of the airbag cushion is additionally formed by two longer mouth side edges, each mouth side edge forming an airbag mouth tube respectively positioned within the pair of diffuser side tubes, the airbag module assembly further including a pair of securing tubes that are wider than the unclosed portions of the diffuser side tubes, the securing tubes extending from one endplate to the other endplate through the respective airbag mouth tubes of the airbag cushion, thereby securing the airbag cushion within the diffuser side tubes of the diffuser.

11. The airbag module assembly of claim 10 wherein the endplates are removably attached to the reaction canister so that the endplates may be removed from the canister to allow access into the canister, whereby the inflator may be removed from the assembled airbag module assembly or mounted within the canister after the diffuser and airbag cushion, with the flange extensions and diffuser containing the folded portion of the airbag cushion independently of the endplates.

12. The airbag module assembly of claim 11 wherein the plurality of diffusing openings formed through the diffuser shelf comprise a pair of generally rectangular openings respectively located adjacent the opposite diffuser ends of the diffuser shelf and a plurality of additional circular openings deployed in rows extending generally between the rectangular openings.

13. The airbag module assembly of claim 12 further comprising an airbag cushion cover covering the open top of the reaction canister and enclosing the airbag cushion therein.

14. The airbag module assembly of claim 7 wherein the endplates are removably attached to the reaction canister so that the endplates may be removed from the canister to allow access into the canister, whereby the inflator may be removed from the assembled airbag module assembly or mounted within the canister after the diffuser and airbag cushion, with the flange extensions and diffuser containing the folded portion of the airbag cushion independently of the endplates.

15. The airbag module assembly of claim 7 wherein the plurality of diffusing openings formed through the diffuser shelf comprise a pair of generally rectangular openings respectively located adjacent the opposite diffuser ends of the diffuser shelf and a plurality of additional circular openings deployed in rows extending generally between the rectangular openings.

16. An airbag module assembly comprising:

a trough-shaped reaction canister having a bottom wall and a pair of sidewalls forming a pair of open ends and an open top, and a pair of removably attached endplates respectively covering the open ends, each side wall having a respective parallel cylindrical channel extending between the open ends, each channel having a lengthwise slot, the first endplate having a stud-receiving opening;

an inflator mounted within the canister adjacent the bottom wall between the endplates and below the parallel channels thereof and having a first end having a stud extending therefrom and a second end, the second end positioned against the second endplate, the first end positioned adjacent the first endplate with the stud extending through the stud-receiving opening and secured thereto to mount the inflator within the reaction canister between the endplates;

a diffuser mounted within the reaction canister between the endplates thereof and above the inflator, the diffuser including a diffuser shelf having a pair of opposite diffuser side edges respectively adjacent the sidewalls of the canister and a pair of opposite diffuser ends respectively adjacent the endplates of the canister, thereby enclosing the inflator within the canister and the endplates, the diffuser shelf having a plurality of diffusing openings formed therethrough, the diffuser further including a pair of diffuser side tubes respectively attached to the side edges of the diffuser shelf with each side tube positioned respectively within the parallel channels formed in the sidewalls of the canister, the diffuser side tubes being wider than the slots in the parallel channels so that the side tubes are secured within the channels, each side tube having a lengthwise unclosed portion;

a pair of flange extensions respectively extending from the opposite diffuser ends of the diffuser shelf and extending generally perpendicular to and towards the open top of the canister;

an airbag cushion mounted within the reaction canister above the diffuser shelf and between the flange extensions of the diffuser, the airbag cushion having a folded portion leading to a generally rectangular open mouth partly formed by opposite mouth ends, the flange extensions fitting within the open mouth of the airbag cushion with the opposite mouth ends held open respectively by the flange extensions and clamped between the flange extensions and the endplates when the endplates are attached to the canister, whereby the flange extensions prevent the mouth ends from collapsing inwardly during inflation of the airbag cushion and help direct the flow of inflation gas into the mouth of the airbag cushion, the flange extensions being sufficiently wide to contain the folded portion of the airbag cushion within the ends of the reaction canister independently of the endplates, whereby the flange extensions also prevent the folded portion of the airbag cushion from getting pinched by the endplates of the reaction canister as one or both endplates are attached, and also allow the endplates to be removed from the canister to allow access therein and removal of the inflator from the assembled airbag module assembly and mounting of the inflator within the canister after the diffuser and airbag cushion, the generally rectangular mouth additionally formed by two longer mouth side edges, each mouth side edge forming an airbag mouth tube respectively positioned within the diffuser side tubes;

a pair of securing tubes extending from one endplate to the other endplate through the respective airbag mouth tubes of the airbag cushion, the securing tubes wider than the unclosed portions in the diffuser side tubes so that the securing tubes secure the airbag cushion within the diffuser side tubes of the diffuser; and an airbag cushion cover covering the open top of the reaction canister and enclosing the airbag cushion therein.

* * * * *